(12) United States Patent
Urtasun et al.

(10) Patent No.: US 11,834,069 B2
(45) Date of Patent: Dec. 5, 2023

(54) SYSTEMS AND METHODS FOR SELECTING TRAJECTORIES BASED ON INTERPRETABLE SEMANTIC REPRESENTATIONS

(71) Applicant: UATC, LLC, San Francisco, CA (US)

(72) Inventors: Raquel Urtasun, Toronto (CA); Abbas Sadat, Toronto (CA); Sergio Casas, Toronto (CA); Mengye Ren, Toronto (CA)

(73) Assignee: UATC, LCC, Mountain View, CA (US)

( * ) Notice: Subject to any disclaimer, the term of this patent is extended or adjusted under 35 U.S.C. 154(b) by 378 days.

(21) Appl. No.: 17/150,984

(22) Filed: Jan. 15, 2021

(65) Prior Publication Data
US 2021/0276591 A1    Sep. 9, 2021

Related U.S. Application Data

(60) Provisional application No. 63/112,376, filed on Nov. 11, 2020, provisional application No. 62/985,847, filed on Mar. 5, 2020.

(51) Int. Cl.
*B60W 60/00* (2020.01)
*G06N 20/00* (2019.01)
(Continued)

(52) U.S. Cl.
CPC ....... *B60W 60/0011* (2020.02); *G06F 18/213* (2023.01); *G06N 20/00* (2019.01);
(Continued)

(58) Field of Classification Search
CPC . B60W 60/0011; G06N 20/00; G06V 10/806; G06V 10/7715; G06V 20/56; G06V 10/764; G06F 18/213
See application file for complete search history.

(56) References Cited

U.S. PATENT DOCUMENTS 11,126,180 B1 *   9/2021   Kobilarov ........... B60W 30/095
11,195,418 B1 *  12/2021   Hong .................... G08G 1/166
(Continued)

OTHER PUBLICATIONS

Bansal et al, "ChauffeurNet: Learning to Drive by Imitating the Best and Synthesizing the Worst", arXiv:1812.03079v1, Dec. 7, 2018, 20 pages.
(Continued)

*Primary Examiner* — Peter D Nolan
*Assistant Examiner* — Mikko Okechukwu Obioha
(74) *Attorney, Agent, or Firm* — Dority & Manning, P.A.

(57) ABSTRACT

Systems and methods for generating semantic occupancy maps are provided. In particular, a computing system can obtain map data for a geographic area and sensor data obtained by the autonomous vehicle. The computer system can identify feature data included in the map data and sensor data. The computer system can, for a respective semantic object type from a plurality of semantic object types, determine, by the computing system and using feature data as input to a respective machine-learned model from a plurality of machine-learned models, one or more occupancy maps for one or more timesteps in the future, and wherein the respective machine-learned model is trained to determine occupancy for the respective semantic object type. The computer system can select a trajectory for the autonomous vehicle based on a plurality of occupancy maps associated with the plurality of semantic object types.

20 Claims, 8 Drawing Sheets

(51) Int. Cl.

| | |
|---|---|
| *G06V 20/56* | (2022.01) |
| *G06F 18/213* | (2023.01) |
| *G06V 10/764* | (2022.01) |
| *G06V 10/77* | (2022.01) |
| *G06V 10/80* | (2022.01) |

(52) U.S. Cl.
CPC ........ *G06V 10/764* (2022.01); *G06V 10/7715* (2022.01); *G06V 10/806* (2022.01); *G06V 20/56* (2022.01); *B60W 2420/52* (2013.01); *B60W 2540/01* (2020.02); *B60W 2554/4049* (2020.02)

(56) References Cited

U.S. PATENT DOCUMENTS

| | | | |
|---|---|---|---|
| 11,495,030 B1* | 11/2022 | Kimchi | B64C 39/024 |
| 2019/0113927 A1* | 4/2019 | Englard | G06N 5/046 |
| 2019/0384303 A1* | 12/2019 | Muller | G05D 1/027 |
| 2020/0110416 A1* | 4/2020 | Hong | G01C 21/3602 |
| 2020/0225669 A1* | 7/2020 | Silva | B60W 60/0011 |
| 2021/0004611 A1* | 1/2021 | Garimella | G06T 11/00 |
| 2021/0046924 A1* | 2/2021 | Caldwell | B60W 30/0956 |
| 2021/0063578 A1* | 3/2021 | Wekel | G01S 7/481 |
| 2021/0101624 A1* | 4/2021 | Philbin | G06V 10/764 |
| 2021/0192748 A1* | 6/2021 | Morales Morales | G05D 1/0088 |
| 2021/0197813 A1* | 7/2021 | Houston | G05D 1/0223 |
| 2021/0309248 A1* | 10/2021 | Choe | B60W 50/06 |
| 2021/0347377 A1* | 11/2021 | Siebert | G05D 1/0274 |
| 2022/0035375 A1* | 2/2022 | Rezaee | G05B 13/027 |
| 2022/0101155 A1* | 3/2022 | Beaudoin | G06N 20/00 |
| 2022/0156576 A1* | 5/2022 | Rasouli | G06N 3/045 |
| 2022/0219726 A1* | 7/2022 | Yadmellat | B60W 60/0011 |

OTHER PUBLICATIONS

Banzhaf et al, "Learning to Predict Ego-Vehicle Poses for Sampling-Based Nonholonomic Motion Planning", arXiv:1812.01127v2, Feb. 1, 2019, 10 pages.
Bojarski et al, "End-to-End Learning for Self-Driving Cars", arXiv:1604.07316v1, Apr. 25, 2016, 9 pages.
Casas et al, "IntentNet: Learning to Predict Intention from Raw Sensor Data", arXiv:2101.07907v1, Jan. 20, 2021, 10 pages.
Casas et al, "SpAGNN: Spatially—Aware Graph Neural Networks for Relational Behavior Forecasting from Sensor Data", arXiv:1910.08233v1, Oct. 18, 2019, 11 pages.
Chai et al, "MultiPath: Multiple Probabilistic Anchor Trajectory Hypotheses for Behavior Prediction", arXiv:1910.05449v1, Oct. 12, 2019, 14 pages.
Chen et al, "Learning by Cheating", arXiv:1912.12294v1, Dec. 27, 2019, 12 pages.
Codevilla et al, "End-to-End Driving via Conditional Imitation Learning", arXiv:1710.02410v2, Mar. 2, 2018, 8 pages.
Codevilla, et al, "Exploring the Limitations of Behavior Cloning for Autonomous Driving", arXiv:1904.08980v1, Apr. 18, 2019, 17 pages.
Elfes, "Using Occupancy Grids for Mobile Robot Perception and Navigation", Computer, Jul. 1989, pp. 46-57.
Fan et al, "An Auto-Tuning Framework for Autonomous Vehicles", arXiv:1808.04913v1, Aug. 14, 2018, 7 pages.
Feichtenhofer et al, "Detect to Track and Track to Detect", arXiv:1710.03958v2, Mar. 7, 2018, 11 pages.
Frossard et al, "DeepSignals: Predicting Intent of Drivers Through Visual Signals", arXiv:1905.01333v1, May 3, 2019, 7 pages.
Hawke et al, "Urban Driving with Conditional Imitation Learning", arXiv:1912.00177v2, Dec. 5, 2019, 8 pages.
Ho et al, "Generative Adversarial Imitation Learning" Conference on Neural Information Processing Systems, Dec. 5-10, 2016, Barcelona, Spain, 9 pages.
Hou et al, "Learning to Steer by Mimicking Features from Heterogeneous Auxiliary Networks", Conference on Artificial Intelligence, Jan. 27-Feb. 1, 2019, pp. 8433-8440.
Jain et al, "Discrete Residual Flow for Probabilistic Pedestrian Behavior Prediction", arXiv:1910.08041v1, Oct. 17, 2019, 13 pages.
Kendall et al, "Learning to Drive in a Day", arXiv:1807.00412v2, Sep. 11, 2018, 7 pages.
Liang et al, "Multi-Task Multi-Sensor Fusion for 3D Object Detection", arXiv:2012.12397v1, Dec. 22, 2020, 11 pages.
Luo et al, "Fast and Furious: Real Time End-to-End 3D Detection, Tracking and Motion Forecasting with a Single Convolutional Net", arXiv:2012.12395v1, Dec. 22, 2020, 9 pages.
Ma et al, "Towards Navigation Without Precise Localization: Weakly Supervised Learning of Goal—Directed Navigation Cost Map", arXiv:1906.02468v1, Jun. 6, 2019, 8 pages.
Manivasagam et al, "LiDARsim: Realistic LiDAR Simulation by Leveraging the Real World", arXiv:2006.09348v1, Jun. 16, 2020, 11 pages.
Muller et al, "Driving Policy Transfer via Modularity and Abstraction", arXiv:1804.09364v3, Dec. 13, 2018, 15 pages.
Phan-Minh et al, "CoverNet: Multimodal Behavior Prediction using Trajectory Sets", arXiv:1911.10298v2, Apr. 1, 2020, 12 pages.
Pomerleau, "ALVINN: An Autonomous Land Vehicle in a Neural Network", Conference on Neural Information Processing Systems, Nov. 27-30, 1989, Denver, Colorado, United States, pp. 305-313.
Ratliff et al, "Maximum Margin Planning", International Conference on Machine Learning, Jun. 25-29, 2006, Pittsburg, Pennsylvania, United States, 8 pages.
Rhinchart et al, "Deep Imitative Models for Flexible Inference, Planning, and Control", arXiv:1810.06544v4, Oct. 1, 2019, 19 pages.
Ridel et al, "Scene Compliant Trajectory Forecast with Agent-Centric Spatio-Temporal Grids", arXiv:1909.07507v1, Sep. 16, 2019, 7 pages.
Sadat et al, "Jointly Learnable Behavior and Trajectory Planning for Self-Driving Vehicles", arXiv:1910.04586v1, Oct. 10, 2019, 8 pages.
Tang et al, "Multiple Futures Prediction", arXiv:1911.00997v2, Dec. 6, 2019, 17 pages.
Thrun, S.: Learning occupancy grid maps with forward sensor models, Carnegie Mellon University, School of Computer Science, 28 pages.
Werling et al, "Optimal Trajectory Generation for Dynamic Street Scenarios in a Frenet frame", International Conference on Robotics and Automation, May 3-8, 2010, Anchorage, Alaska, United States, pp. 987-993.
Wulfmeier et al, "Deep Inverse Reinforcement Learning", arXiv:1507.04888v1, Jul. 17, 2015, 9 pages.
Yang et al, "PIXOR: Real-Time 3D Object Detection from Point Clouds", arXiv:1902.06326v3, Mar. 2, 2019, 10 pages.
Zeng et al, "End-to-End Interpretable Neural Motion Planner", arXiv:2101.06679v1, Jan. 17, 2021, 10 pages.
Zhao et al, "LaTeS: Latent Space Distillation for Teacher-Student Driving Policy Learning", arXiv:1912.02973v1, Dec. 6, 2019, 12 pages.
Ziehart et al, "Maximum Entropy inverse Reinforcement Learning", Conference on Artificial Intelligence, Jul. 13-17, 2008, Chicago, Illinois, United States, pp. 1433-1438.

* cited by examiner

SYSTEMS AND METHODS FOR SELECTING TRAJECTORIES BASED ON INTERPRETABLE SEMANTIC REPRESENTATIONS

RELATED APPLICATION

This application claims priority to and the benefit of U.S. Provisional Patent Application No. 62/985,847, filed Mar. 5, 2020 and U.S. Provisional Patent Application No. 63/112,376, filed Nov. 11, 2020 which are hereby incorporated by reference in its entirety.

FIELD

The present disclosure relates generally to autonomous vehicles. More particularly, the present disclosure relates to path planning in autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system including one or more processors, map data for a geographic area and sensor data obtained by the autonomous vehicle. The method can include identifying, by the computing system, feature data included in the map data and sensor data. The method can include, for a respective semantic object type from a plurality of semantic object types, determining, by the computing system and using feature data as input to a respective machine-learned model from a plurality of machine-learned models, one or more occupancy maps for one or more timesteps in the future, and wherein the respective machine-learned model is trained to determine occupancy for the respective semantic object type. The method can include selecting, by the computing system, a trajectory for the autonomous vehicle based on a plurality of occupancy maps associated with the plurality of semantic object types.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
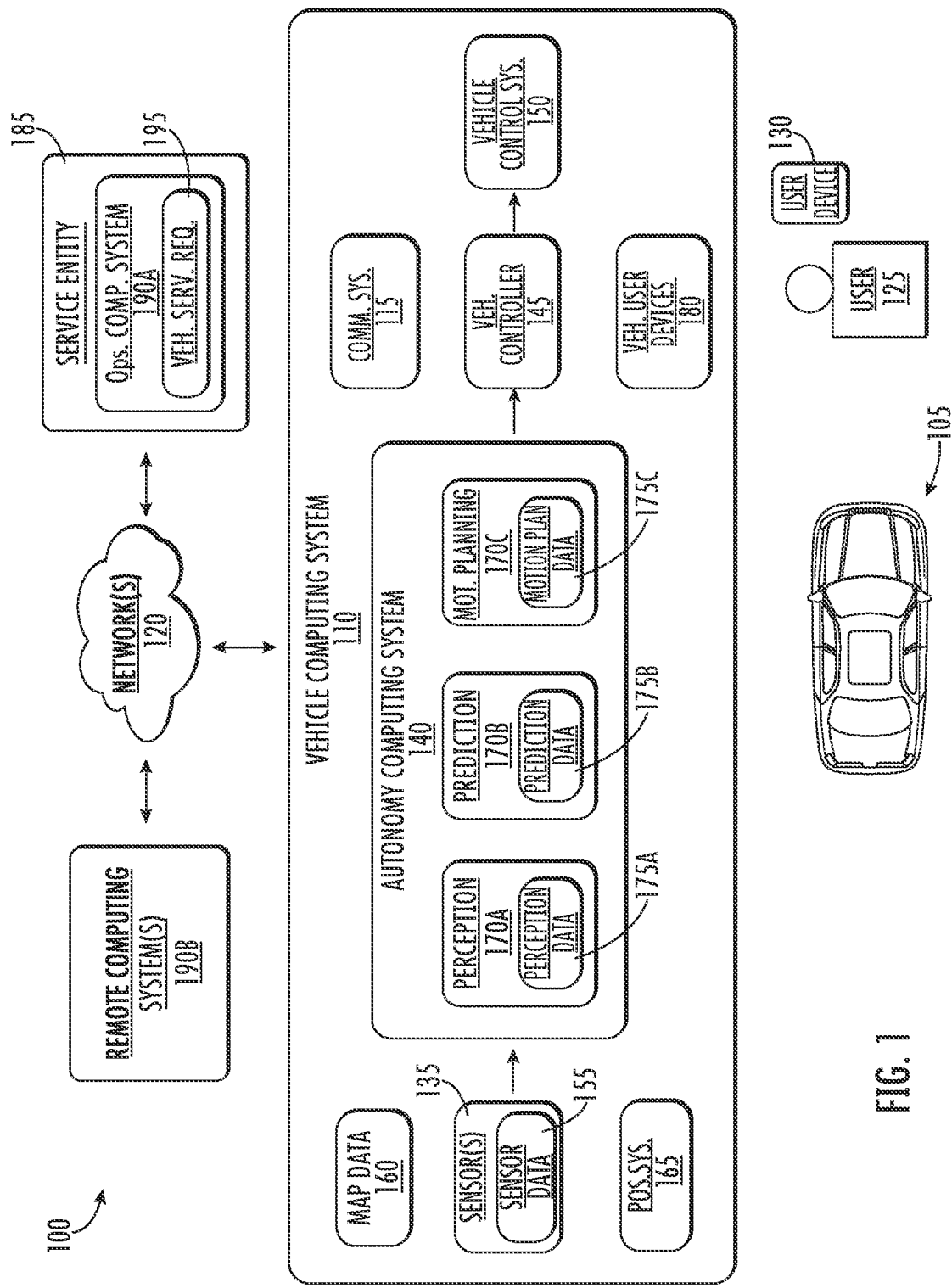
FIG. 1 depicts a block diagram of an example autonomous vehicle according to example embodiments of the present disclosure.

Generally, the present disclosure is directed toward an end-to-end system for selecting a trajectory based on interpretable semantic representations. To do so, a vehicle computing system associated with an autonomous vehicle can access sensor data of the area around the autonomous vehicle and map data associated with the geographic location of the autonomous vehicle. The sensor data can be produced by a LIDAR sensor of the autonomous vehicle and can include a plurality of sensor sweeps. Each sensor sweep can include the data collected during a full revolution of the LIDAR sensor. In some examples, the map data can include data representing the geographic area within a predetermined distance from the autonomous vehicle (e.g., within 50 meters of the autonomous vehicle) and can include data, among other things, describing lane boundaries, road regulation data (e.g., stop signs, stop lights, etc.) and sidewalk/crosswalk data.

A machine-learned model can use the map data and the sensor data as input and can identify features from the map and sensor data. The map data can be rasterized prior to being used as input so that features of the map data can be highlighted. In addition, the sensor data can be point cloud data produced by a LIDAR sensor and can be subdivided into a plurality of voxels before being input into a machine-learned model. In some examples, the feature data output by the machine-learned model for the sensor data and the feature data output by the machine-learned model for the map data can be fused into a single representation.

The vehicle computing system can generate a plurality of predicted occupancy maps based on the fused feature data. Each occupancy map can be associated with a particular semantic object type (e.g., vehicles, pedestrians, bicyclists, etc.) and a particular time step. The occupancy map can be a grid of points, each point representing a location in the area around the autonomous vehicle (e.g., a 40 cm voxel cube).

Each occupancy map can be associated with a particular semantic object type. For example, semantic object types can include vehicles, pedestrians, and/or bicycles. In addition, each semantic object type can include one or more subtypes. For example, the semantic object type (e.g., an object category) can include stationary vehicles, moving vehicles, vehicles in the target route, occluded vehicles, and vehicles in oncoming traffic as subtypes.

Each occupancy map can be generated by a machine-learned model that has been trained for a particular semantic object type. Each point in the occupancy map can have a value that represents whether the point is predicted to be occupied or unoccupied. Each occupancy map can be associated with a particular time step. Thus, the system can generate a plurality of occupancy maps associated with each semantic object type and each sub-object type as well as with each time step, beginning with the current time step and including a plurality of timesteps until a predetermined point (or number of time steps) in the future. In addition, each point can have an associated confidence value which represents the degree of certainty that the cell associated with the point was/is/will be in fact occupied. For example, if the vehicle computing system considers 15 object types and subtypes and seeks to predict the occupancy at each of five distinct time steps in the future, the vehicle computing system can generate 75 distinct occupancy maps.

The plurality of predicted occupancy maps can represent, when considered together, the location of objects in the future. Based on these predicted occupancy maps, the vehicle computing system can select a trajectory for the autonomous vehicle. To do so, the vehicle computing system can generate a plurality of potential trajectories. The vehicle computing system can generate a cost for each potential trajectory. For example, the plurality of predicted occupancy maps can be used to determine a cost for a potential trajectory. The vehicle computing system can select a trajectory from the plurality of candidate trajectories based on the costs associated with each trajectory.

An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to the machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment. Each device can include a compute node configured to run one or more processes. A process can include a plurality of function nodes (e.g., software functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks). By way of example, with respect to the vehicle's onboard computing system, its processes (and their respective function nodes) can be organized into a directed software graph architecture (e.g., including sub-graphs) that can be executed to communicate and perform the operations of the autonomous vehicle (e.g., for autonomously sensing the vehicle's environment, planning the vehicle's motion, etc.).

The vehicle computing system can utilize the sensor data to identify one or more objects in the local environment of the autonomous vehicle, either directly by generating specific shape (e.g., with a bounding box) and position of the objects or indirectly, by generating an occupancy map which describes which areas of the environment are occupied but does not identify particular objects directly. Using this sensor data, the vehicle computing system can generate perception data that describes one or more object(s) in the vicinity of the autonomous vehicle (e.g., current location, speed, heading, shape/size, etc.) or the occupancy of the area around the autonomous vehicle.

The generated perception data can be utilized to predict the future motion of the object(s) or the future occupancy of the space. For example, the vehicle computing system can use the perception data to generate predictions for the movement of one or more objects as an object trajectory including one or more future coordinates/points. In some implementations, the perception and prediction functions of the vehicle computing system can be included within the same system.

The autonomous vehicle can select and implement a trajectory for the autonomous vehicle to navigate a specific segment of the route. For instance, the trajectory can be translated and provided to the vehicle control system(s) (e.g., via a vehicle interface/controller) that can generate specific control signals for the autonomous vehicle (e.g., alter steering, braking, velocity, and so on). The specific control signals can cause the autonomous vehicle to move in accordance with the selected trajectory.

To help implement the semantic occupancy analysis technology described herein, the vehicle computing system can access map data for a geographic area around the autonomous vehicle. The map data can include data describing among other things, lanes, boundaries, crossing areas, and traffic control mechanisms (e.g., stop signs, traffic lights, etc.). The map data can be rasterized such that important aspects of the map data can be made more distinct. The vehicle computing system can obtain sensor data from the autonomous vehicle. Sensor data can include data from one or more LIDAR sensors, one or more cameras, one or more RADAR sensors, and so on.

In some examples, the sensor data can include LIDAR point cloud data from a plurality of LIDAR sweeps. Each sweep can represent a single revolution of the LIDAR sensor and include data collected during that sweep. For example, the sensor data can include the data from the previous five LIDAR sweeps.

The map data can be used as input to a machine-learned model. The machine-learned model can be a model trained to identify feature data within the map data. Similarly, the sensor data can be used as input to a machine-learned model. The machine-learned model can be trained to identify feature data within the sensor data. In some examples, the resolution of the map data and/or sensor data can be changed. For example, the sensor data can be scaled down such that each point in the sensor data (e.g., each voxel) can represent a larger amount of total area.

The feature data from the map data and the feature data from the sensor data can be fused into a single fused representation of the data. For example, the fused representation can be a three-dimensional grid of points, each point including feature data from the map data and feature data from the sensor data.

The vehicle computing system can use the fused representation of the feature data to generate a plurality of semantic occupancy maps. To do so, the vehicle computing system can include a plurality of trained machine-learned models. Each machine-learned model can be a neural network, such as a convolutional neural network, a recurrent neural network, etc. Each machine-learned model can be trained to be associated with a particular semantic object type. For example, a first machine-learned model can be associated with vehicles, a second machine-learned model can be associated with pedestrians, and a third machine-learned model can be associated with bicycles.

In addition, machine-learned models can be trained to be associated with semantic subtype objects. For example, the vehicle semantic object type can include subtypes such as parked vehicles, in-lane vehicles, vehicles in the oncoming lane, occluded vehicles, and vehicles in the projected path of the autonomous vehicle. In some examples, object subtypes can include occluded objects. For example, occluded pedestrians and occluded bicyclists can have associated machine-learned models that are trained to generate semantic occupancy maps for those object subtypes.

To generate an occupancy map, the fused representation of the identified feature data can be used as input to each of the plurality of machine-learned models. The machine-learned models can output an occupancy map for the specific semantic object type (or object subtype) for which it has been trained. These occupancy maps are interpretable (e.g., able to be read and understood by humans). For example, the occupancy map can be a grid of points, each point representing a location in the area around the autonomous vehicle (e.g., a 40 cm voxel cube). Each point can be designated as occupied or unoccupied by the specific semantic object type associated with the specific machine-learned models. Thus, the occupancy maps are interpretable because, by reviewing all the occupancy maps, a human reader (e.g., an engineer reviewing the motion planning process of the autonomous vehicle) can understand what objects are around the autonomous vehicle and where each object is.

Thus, each object detected can be represented without a specifically defined shape or bounding box. Instead, the occupancy maps can represent objects indirectly, as a series of connected occupied points within a particular semantic occupancy map. Each map can include only occupancy data for its associated semantic object type (or subtype). Thus, the occupancy maps for all semantic object types are needed to detect all relevant objects within the area around the autonomous vehicle.

Each occupancy map can be associated with a particular semantic object type. For example, semantic object types can include vehicles, pedestrians, and bicycles. In addition, each semantic object type can include one or more subtypes. For example, the semantic object type can include stationary vehicles, moving vehicles, vehicles in the target route, occluded vehicles, and vehicles in oncoming traffic as subtypes.

Each occupancy map can be generated by a machine-learned model that has been trained for a particular semantic object type. Each point in the occupancy map can have a value that represents whether the point is predicted to be occupied or predicted to be unoccupied. Each occupancy map can be associated with a particular timestep. For example, each point can have a binary value where the value one represents that the associated space is predicted to be occupied and the value zero represents that the associated space is predicted to be unoccupied. Other representations of occupancy can be used (e.g. Boolean values, etc.) as long as the system predetermines which values represent occupancy and which values represent no occupancy.

Thus, the system can generate a plurality of occupancy maps associated with each semantic object type and each sub-object type as well as with each time step, beginning with the current time step and including a plurality of timesteps until some point in the future. In addition, each point can have an associated confidence value which represents the degree of certainty that the cell associated with the point was in fact occupied.

For example, the vehicle computing system can begin by using the fused representation of the feature data as input to a machine-learned model associated with a particular semantic object type. This machine-learned model can output the predicted occupancy of the associated semantic object type at a first time step (e.g., the current time). This occupancy map can then be used as input to another machine-learned model that uses it to generate an occupancy map for the next time step. This process can continue until the predetermined final time step has been reached. It can also be repeated for each other semantic object type or subtype. In addition, if the machine-learned model is a recurrent neural network, the output of each machine-learned model (and the initial fused feature representation) can be combined with the output of each previous machine-learned model and provided as input to the machine-learned model for the next step, such that all previous predictions can be considered by each stage of the process, not merely the output of the previous stage.

In addition to generating a semantic occupancy map for each semantic object type and subtype, the vehicle computing system can generate a plurality of semantic occupancy maps for multiple time steps. Thus, the first occupancy map generated for a particular semantic object type can represent the predicted occupancy at a current time. The resulting semantic occupancy map can be used as input to another machine-learned model. This machine-learned model can generate an occupancy map for the next time step (e.g., 0.5 seconds in the future). This process can be repeated until a predetermined number of future time step occupancy maps have been generated. Thus, if the vehicle computing system uses predictions for up to 5 seconds into the future, eleven occupancy maps can be generated for each semantic object type or subtype (e.g., a current occupancy map and ten future occupancy maps each representing the predicted occupancy at a 0.5-second time step into the future).

The plurality of predicted occupancy maps can represent, when considered together, the predicted occupancy of the space around the autonomous vehicle at one or more points in the future. The predicted occupancy can represent the expected positions of objects in the future. Based on these predicted occupancy maps, the vehicle computing system can select a trajectory for the autonomous vehicle. To do so, the vehicle computing system can generate a plurality of potential trajectories. The vehicle computing system can generate a cost for each potential trajectory. For example, the predicted occupancy map can be used to determine a cost score for a potential trajectory based on the plurality of occupancy maps. The vehicle computing system can select a trajectory from the plurality of potential trajectories based on the costs associated with each trajectory.

The following provides an end-to-end example of the technology described herein. A vehicle computing system can obtain map data for a geographic area and sensor data obtained by the autonomous vehicle. In some examples, the sensor data can be generated by a LIDAR sensor and can include multiple LIDAR sweeps. Each sweep can represent a full rotation of the LIDAR sensor. In some examples, the map data can include data describing the position of lanes, boundaries, crossing areas, and traffic control mechanisms.

The vehicle computing system can identify feature data included in the map data and sensor data. Feature data can include representations of data included in the map data and the sensor data but may not be interpretable to humans. Thus, the machine-learned models can be trained to extract features but those features may not be useful to a human reviewing the feature data.

The vehicle computing system can generate a fused representation of the feature data included in the map data and the sensor data. Thus, the fused representation can include feature data for a three-dimensional representation of a geographic space included in the map data and the sensor data. Each position in the three-dimensional data can include feature data extracted from both the map data and the sensor data. Further machine-learned models can be trained to use this feature data to generate occupancy maps.

The vehicle computing system can, for a respective semantic object type from a plurality semantic object types, determine using feature data as input to a respective machine-learned model from a plurality of machine-learned models, one or more occupancy maps for one or more timesteps in the future. The respective machine-learned model can be trained to determine occupancy for the respective semantic object type. Thus, the vehicle computing system can include a machine-learned model trained specifically to determine occupancy for each specific semantic object type and subtype.

In some examples, each occupancy map includes a grid of points, each point representing a specific area of the environment around the autonomous vehicle at a particular time step. For example, the environment around the autonomous vehicle can be a three-dimensional space 50 meters long, 40 meters wide, and 5 meters high. This space can be subdivided into a plurality of voxels (e.g., three-dimensional boxes) that each represent a portion of the total space (e.g., a 40 cm square cube). Each point can be associated with one of the voxels and can represent whether that voxel is occupied. In some examples, each point in the grid of points includes occupancy data representing whether the represented area includes an object of the semantic object type associated with the occupancy map.

In addition, the same position may be marked as occupied on different semantic occupancy maps. This may be a result of two distinct objects being associated with the same area of space representing a particular point on the occupancy maps. For example, a passenger exiting a vehicle may result in the space associated with the exiting passenger being marked as occupied on both the vehicle occupancy map and on the pedestrian occupancy map. In other examples, a particular point may have a possibility of one of the multiple different semantic object types or subtypes. For example, a vehicle may have the possibility of turning into the planned route of the autonomous vehicle. As such, one or more points associated with the vehicle may be marked as occupied on both a semantic occupancy map associated with oncoming vehicles and a semantic occupancy map associated with vehicles on the intended route. In some examples, each point in each semantic occupancy map can have an associated confidence value.

The confidence value can represent the degree to which the point will actually be occupied. In addition, the confidence values associated with each point on a particular semantic occupancy map can represent the degree to which the vehicle computing system is unsure of a future state or position of the vehicle. For example, a vehicle that is slowing may result in occupancy being marked on both an occupancy map associated with stationary or parked vehicles in a future time step and an occupancy map associated with vehicles in an oncoming lane associated with a future time step. The confidence values associated with the points on each occupancy map can be associated with the likelihood of the vehicle parking or continuing after slowing down. Thus, the points associated with the vehicle in the occupancy map for parked vehicles can have a 75% confidence value and the points associated with a vehicle in an oncoming lane occupancy can have a 25% confidence value. This would represent that the vehicle computing system has established that the vehicle is more likely to park than to continue in the oncoming lane, without ignoring the second possibility entirely.

In some examples, the plurality of machine-learned models can be recurrent neural networks. In other examples, the plurality of machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks.

The vehicle computing system can select a trajectory for the autonomous vehicle based on a plurality of occupancy maps associated with the plurality of semantic object types. To do so, the vehicle computing system can generate a plurality of candidate trajectories. The candidate trajectories can be based on a basis path, which represents a provisional path through an area, and include lateral variations from the basis path.

For a respective candidate trajectory in the plurality of candidate trajectories, the vehicle computing system can determine a cost associated with the respective candidate trajectory. Costs can be calculated based on the avoidance of object collision, keeping the autonomous vehicle on the travel way/within lane boundaries, preferring gentle accelerations to harsh ones, vehicle dynamics parameters (e.g., to keep the ride smooth, acceleration, jerk, etc.), and/or map parameters (e.g., speed limits, stops, travel way boundaries, etc.). The costs can take into account at least one of the following object cost(s): collision costs (e.g., cost of avoiding/experience potential collision, minimization of speed, etc.); overtaking buffer (e.g., give 4 ft of space with overtaking a bicycle, etc.); headway (e.g., preserve stopping distance when applying adaptive cruise control motion a moving object, etc.); actor caution (e.g., preserve the ability to stop for unlikely events, etc.); behavioral blocking (e.g., avoid overtaking backed-up traffic in the vehicle's lane, etc.); or other parameters. In some implementations, the cost function(s) can account for fixed buffer and/or speed dependent buffers (e.g., requiring more space for actors when the vehicle is passing at higher speeds, etc.). In some implementations, the costs can account for map geometry features such as the distance from the initial basis path, the location of lane boundaries, and road boundaries.

In some examples, each cost can be associated with a particular sub-cost value, representing one aspect of the cost of a particular trajectory. Each sub-cost value can be assigned a weight based on one or more factors including the current situation of the autonomous vehicle. The sub-cost values can then be combined to produce a total cost of a trajectory at least partially based on the weights assigned to each sub-cost value.

In some examples, the vehicle computing system can select a trajectory from the plurality of trajectories based, at least in part, on the costs associated with the plurality of trajectories. For example, the vehicle computing system can select the candidate trajectory with the lowest calculated cost value. In some examples, the costs associated with the respective candidate trajectory is based, at least in part, on the plurality of occupancy maps.

In some examples, the vehicle computing system can generate vehicle control signals based on the selected candidate trajectory. The autonomous vehicle can then execute the control signals such that the autonomous vehicle can follow the selected trajectory.

Various means can be configured to perform the methods and processes described herein. For example, a computing system can include data obtaining unit(s), feature identification unit(s), map generation unit(s), trajectory selection unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain map data for a geographic area and sensor data obtained by the autonomous vehicle. For example, a vehicle computing system can receive sensor data from one or more sensors and access map data from a database. A data obtaining unit is one example of a means for obtaining map data for a geographic area and sensor data obtained by the autonomous vehicle.

The means can be configured to determine, using one or more machine-learned models, feature data included in the map data and sensor data. For example, the vehicle computing system can use a machine-learned model to identify one or more features. A feature identification unit is one example of a means for determining, using one or more machine-learned models, feature data included in the map data and sensor data.

The means can be configured to determine for a respective semantic object type from a plurality semantic object types and using feature data as input to a machine-learned model associated with the respective semantic object type, one or more occupancy maps for one or more timesteps in the future. For example, the vehicle computing system can generate a plurality of occupancy maps for each semantic object type and subtype and for a plurality of time steps. A map generation unit is one example of a means for, determining, for a respective semantic object type from a plurality semantic object types and using feature data as input to a machine-learned model associated with the respective semantic object type, one or more occupancy maps for one or more timesteps in the future.

The means can be configured to select a trajectory for the autonomous vehicle based on a plurality of occupancy maps associated with the plurality of semantic object types. For example, the vehicle computing system can select a trajectory from a plurality of candidate trajectories. A trajectory selection unit is one example of a means for selecting a trajectory for the autonomous vehicle based on a plurality of occupancy maps associated with the plurality of semantic object types.

The systems and methods described herein provide a number of technical effects and benefits. More particularly, the systems and methods of the present disclosure provide improved techniques for performing the perception and prediction functions associated with an autonomous vehicle. Specifically, the vehicle computing system can generate interpretable semantic occupancy maps to use when selecting a route for the autonomous vehicle as described above and allow a vehicle computing system to efficiently and safely react to the objects in the environment around the autonomous vehicle. As a result, the vehicle computing system can more efficiently plan paths and select appropriate trajectories. This results in a reduction in the number of processing cycles necessary, reducing the amount of data storage needed, and reducing the amount of energy used by the system. Reducing energy consumption also increases the useful battery life of any battery systems included in the autonomous vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WIFI access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects within the surrounding environment of the vehicle 105 based at least in part on the sensor data from the sensors 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 170B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can consider a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of vehicle 105 can provide user input to adjust a destination location of vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., it's one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
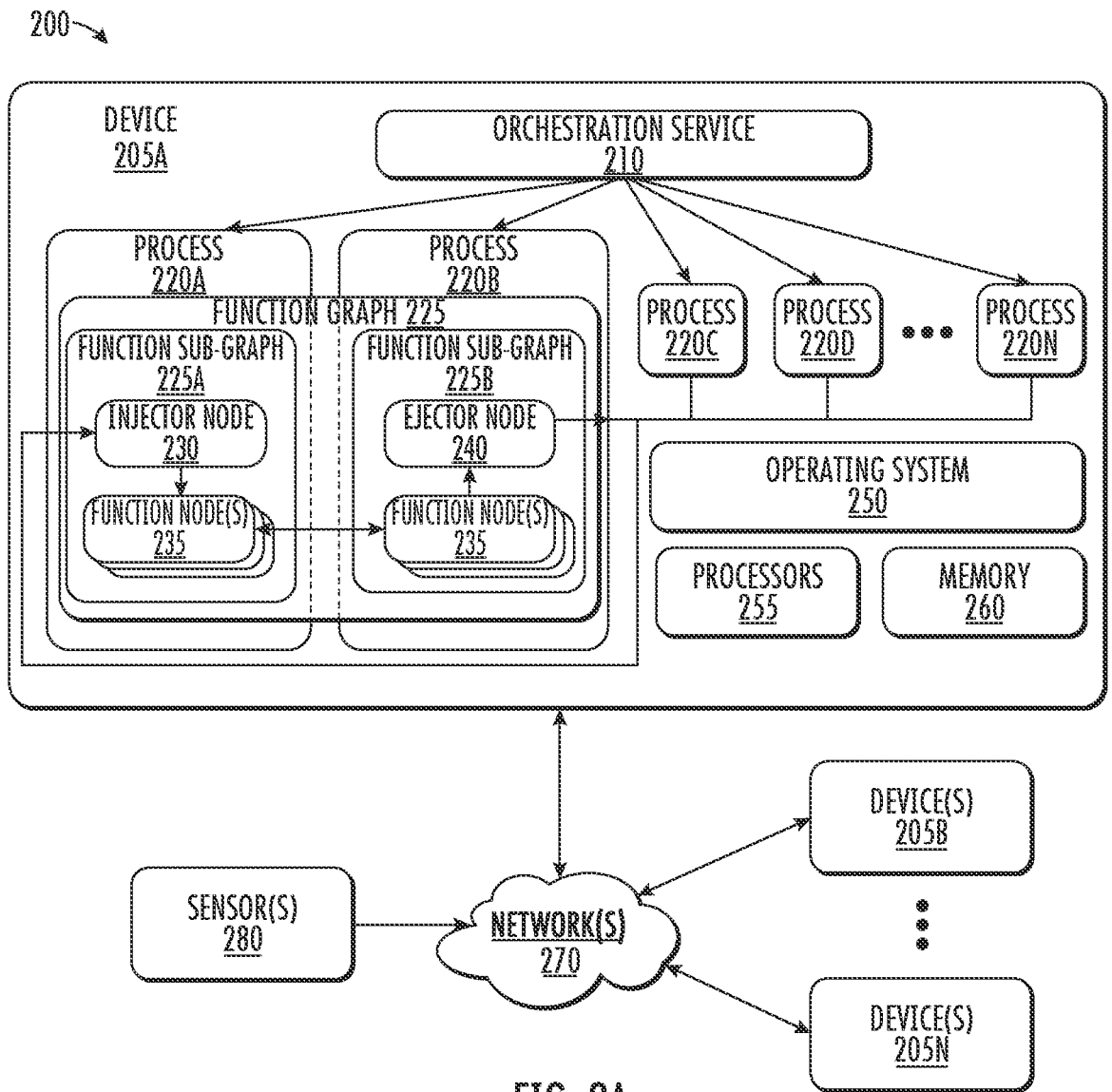
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

Figure 2B:
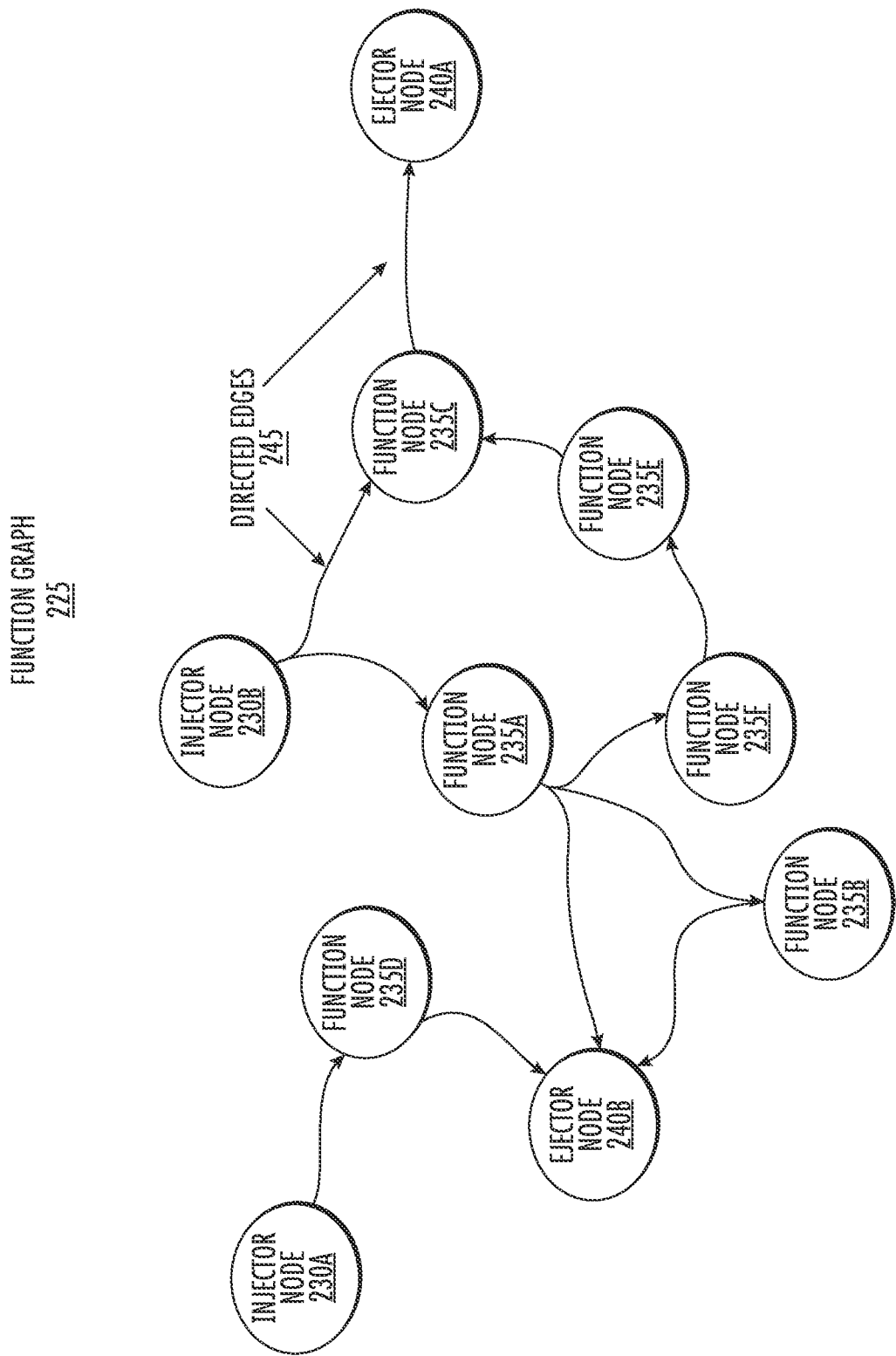
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a nominal path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 120. For instance, the plurality of devices 205A-N (and/or processes 220A-N of device 205A) can communicate over one or more communication channels 120. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. The messages, for example, can include function output data associated with a respective function node (e.g., 235).

Figure 3:
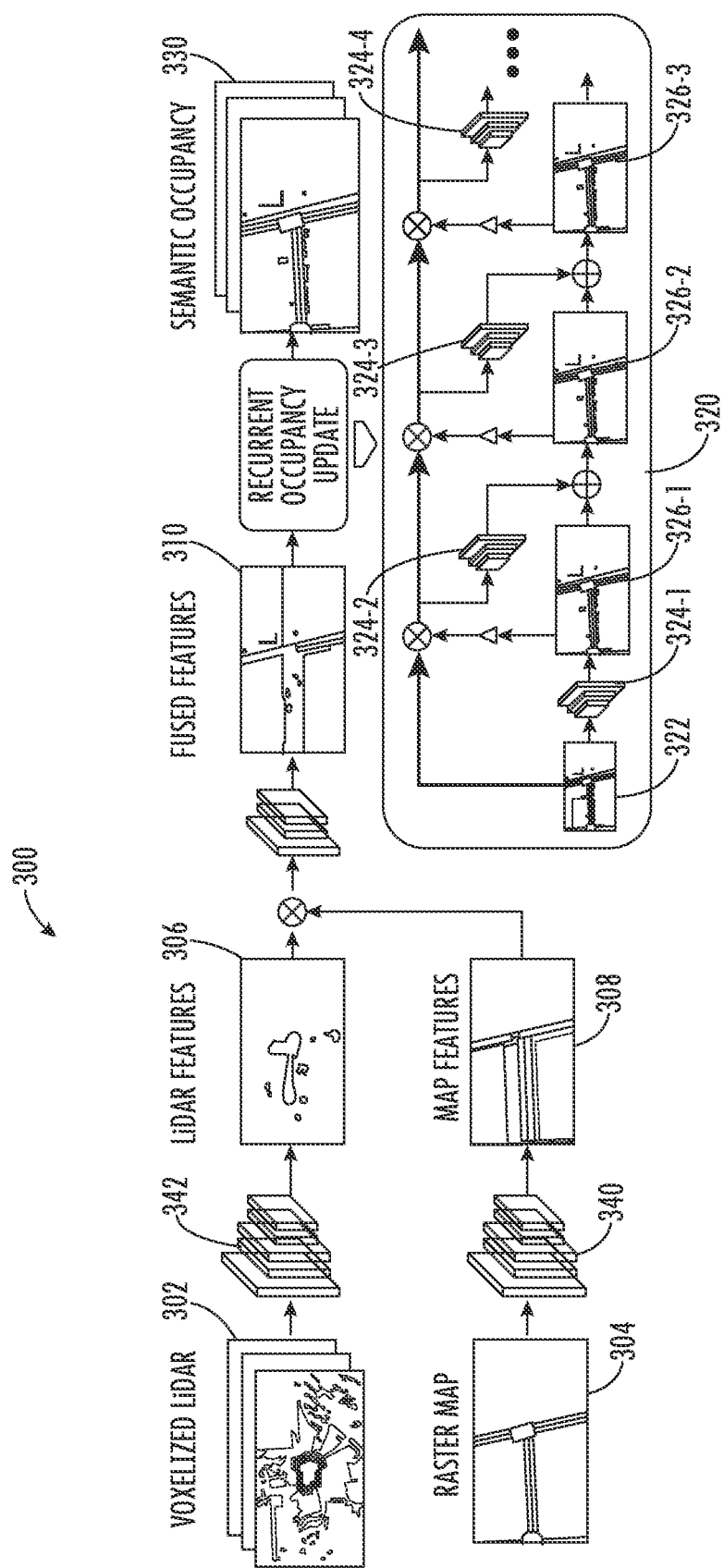
FIG. 3 depicts an example flow chart for generating semantic occupancy maps according to example implementations of the present disclosure.

FIG. 3 depicts an example flow chart 300 for generating semantic occupancy maps according to example implementations of the present disclosure. To generate semantic occupancy maps, the vehicle computing system (e.g., vehicle computing system 110 in FIG. 1) can access map data for a geographic area around the autonomous vehicle (e.g., autonomous vehicle 105 in FIG. 1). The map data can include data describing among other things, lanes, boundaries, crossing areas, and traffic control mechanisms (e.g., stop signs, traffic lights, etc.). The map data can be rasterized to produce a raster map 304 such that important aspects of the map data can be made more distinct. Rasterization can include taking an image described in a vector graphics format (shapes) and converting it into a raster image (a series of pixels, dots or lines, which, when displayed together, create the image which was represented via shapes) The vehicle computing system (e.g., vehicle computing system 110 in FIG. 1) can obtain sensor data from sensor(s) of the autonomous vehicle (e.g., sensor(s) 135 of autonomous vehicle 105 in FIG. 1). For example, the sensor data can include data from one or more LIDAR sensors, one or more cameras, one or more RADAR sensors, and so on.

In some examples, the sensor data can include LIDAR point cloud data from a plurality of LIDAR sweeps. Each sweep can represent a single revolution of the LIDAR sensor and include data collected during that sweep. For example, the sensor data can include the data from the previous five LIDAR sweeps. The LIDAR point cloud data can be voxelized (e.g., subdividing the area covered by the LIDAR point cloud data into a plurality of equal sized sub-areas and generating an occupancy value for each sub-area) to produce voxelized LIDAR data 302, wherein voxelized LIDAR data 302 can be LIDAR point cloud data that is represented by subdividing the area covered by the LIDAR sensor into a plurality of voxels (e.g., three dimensional sub-areas of the total area that have the same dimensions). In some examples, the voxels can include data representing whether the particular voxel is occupied (e.g., has at least one point in the point cloud data within it).

The raster map 304 can be used as input to a machine-learned model 340. The machine-learned model 340 can be a model trained to identify feature data within the map data and to change the scale of the map data. Similarly, the voxelized LIDAR data 302 (or other sensor data) can be used as input to a machine-learned model 342. The machine-learned model 342 can be trained to identify feature data within the sensor data. Feature data can include low level elements of the voxelized LIDAR data including edges, corners, blobs, etc. In some examples, the machine-learned models (340, 342) can alter the resolution of the raster map 304 and/or voxelized LIDAR data 302. For example, the voxelized LIDAR data 302 can be scaled down such that each point in the voxelized LIDAR data 302 (e.g., each voxel) can represent a larger amount of total area.

The feature data generated by the machine-learned models (340, 342) can include LIDAR features 306 and map features 308. The LIDAR features 306 and the map features 308 can be fused into a single fused representation 310 of the feature data. For example, the fused representation 310 can be a three-dimensional grid of points, each point including feature data from the LIDAR features 306 and feature data from the map features 308.

The vehicle computing system (e.g., vehicle computing system 110 in FIG. 1) can use the fused representation 310 of the feature data to generate a plurality of semantic occupancy maps 330. To do so, the vehicle computing system (e.g., vehicle computing system 110 in FIG. 1) can include a plurality of trained machine-learned models. Each machine-learned model can be a neural network, such as a convolutional neural network, a recurrent neural network, etc. Each machine-learned model can be trained to be associated with a particular semantic object type. For example, a first machine-learned model can be associated with vehicles, a second machine-learned model can be associated with pedestrians, and a third machine-learned model can be associated with bicycles.

In addition, machine-learned models can be trained to be associated with semantic subtype objects. For example, the vehicle semantic object type can include subtypes such as parked vehicles, in-lane vehicles, vehicles in the oncoming lane, occluded vehicles, and vehicles in the projected path of the autonomous vehicle. In some examples, object subtypes can include occluded objects. For example, occluded pedestrians and occluded bicyclists can have associated machine-learned models that are trained to generate semantic occupancy maps for those object subtypes.

To generate a map, the fused representation 310 of the identified feature data can be used as input to each of the plurality of machine-learned models. The machine-learned models can output an occupancy map for the specific semantic object type (or object subtype) for which it has been trained. These occupancy maps 330 are interpretable (e.g., able to be read and understood by humans, computing systems, etc.). For example, an occupancy map can be a grid of points, each point representing a location in the area around the autonomous vehicle (e.g., a 40 cm voxel cube). Each point can be designated as occupied or unoccupied by the specific semantic object type associated with the specific machine-learned models. By reviewing all the occupancy maps 330, a reader (e.g., a human designer reviewing logs of how a motion planning decision was made) can understand what objects are around the autonomous vehicle (e.g., autonomous vehicle 105 in FIG. 1) and where each object is.

Thus, each object detected can be represented without a specifically defined shape or bounding box. Instead, the occupancy maps 330 can represent objects indirectly, as a series of connected occupied points within a particular semantic occupancy map. Each map can include only occupancy data for its associated semantic object type (or subtype). Thus, the occupancy maps 330 for all semantic object types are needed to detect all relevant objects within the area around the autonomous vehicle.

Each occupancy map can be associated with a particular semantic object type. For example, semantic object types can include vehicles, pedestrians, and bicycles. In addition, each semantic object type can include one or more subtypes. For example, the semantic object type can include stationary vehicles, moving vehicles, vehicles in the target route, occluded vehicles, and vehicles in oncoming traffic as subtypes.

Each occupancy map can be generated by a machine-learned model that has been trained for a particular semantic object type. Each point in the occupancy map can have a value that represents whether the point is predicted to be occupied or predicted to be unoccupied. Each occupancy map can be associated with a particular timestep. For example, each point can have a binary value where the value one represents that the associated space is predicted to be occupied and the value zero represents that the associated space is predicted to be unoccupied. Other representations of occupancy can be used (e.g. Boolean values, etc.) as long as the system predetermines which values represent occupancy and which values represent no occupancy.

Thus, the vehicle computing system (e.g., vehicle computing system 110 in FIG. 1) can generate a plurality of occupancy maps 330 associated with each semantic object type and each sub-object type as well as with each time step, beginning with the current time step and including a plurality of timesteps until some point in the future. In addition, each point can have an associated confidence value which represents the degree of certainty that the cell associated with the point was in fact occupied.

For example, the vehicle computing system (e.g., vehicle computing system 110 in FIG. 1) can begin by using the fused representation 310 of the feature data as input 322 to a machine-learned model 324-1 associated with a particular semantic object type. This machine-learned model 324-1 can output the predicted occupancy 326-1 of the associated semantic object type at a first time step (e.g., the current time). The occupancy map 326-1 can then be used as input to another machine-learned model 324-2 that uses it to generate an occupancy map 326-2 for the next time step. This process can continue, with the output of each stage (326-1, 326-2, 326-3) being used as input to a machine-learned model (324-1, 324-2, 324-3, and 324-4) associated with subsequent times steps until the predetermined final time step has been reached. It can also be repeated for each other semantic object type or subtype. In addition, if the machine-learned model is a recurrent neural network 320, the output of each machine-learned model (and the initial fused feature representation) can be combined with the output of each previous machine-learned model and provided as input to the machine-learned model for the next step, such that all previous predictions can be considered by each stage of the process, not merely the output of the previous stage.

In addition to generating a semantic occupancy map for each semantic object type and subtype, the vehicle computing system (e.g., vehicle computing system 110 in FIG. 1) can generate a plurality of semantic occupancy maps 330 for multiple time steps. Thus, the first occupancy map 326-1 generated for a particular semantic object type can represent the predicted occupancy at a current time. The resulting semantic occupancy map 326-1 can be used as input to another machine-learned model 324-2. The machine-learned model 324-2 can generate an occupancy map 326-2 for the next time step (e.g., 0.5 seconds in the future). This process can be repeated until a predetermined number of future time step occupancy maps have been generated. Thus, if the vehicle computing system (e.g., vehicle computing system 110 in FIG. 1) uses predictions for up to 5 seconds into the future, eleven occupancy maps 330 can be generated for each semantic object type or subtype (e.g., a current occupancy map and ten future occupancy maps each representing the predicted occupancy at a 0.5-second time step into the future).

The plurality of predicted occupancy maps 330 can represent, when considered together, the predicted occupancy of the space around the autonomous vehicle (e.g., autonomous vehicle 105 in FIG. 1) at one or more points in the future. The predicted occupancy can represent the expected positions of objects in the future. Based on these predicted occupancy maps 330, the vehicle computing system (e.g., vehicle computing system 110 in FIG. 1) can select a trajectory for the autonomous vehicle (e.g., autonomous vehicle 105 in FIG. 1). To do so, the vehicle computing system (e.g., vehicle computing system 110 in FIG. 1) can generate a plurality of potential trajectories. The vehicle computing system (e.g., vehicle computing system 110 in FIG. 1) can generate a cost for each potential trajectory. For example, the predicted occupancy map can be used to determine a cost score for a potential trajectory based on the plurality of occupancy maps. The vehicle computing system (e.g., vehicle computing system 110 in FIG. 1) can select a trajectory from the plurality of potential trajectories based on the costs associated with each trajectory.

The vehicle computing system (e.g., vehicle computing system 110 in FIG. 1) can initiate a motion control for the autonomous vehicle (e.g., autonomous vehicle 105 in FIG. 1) to implement the selected trajectory.

Figure 4:
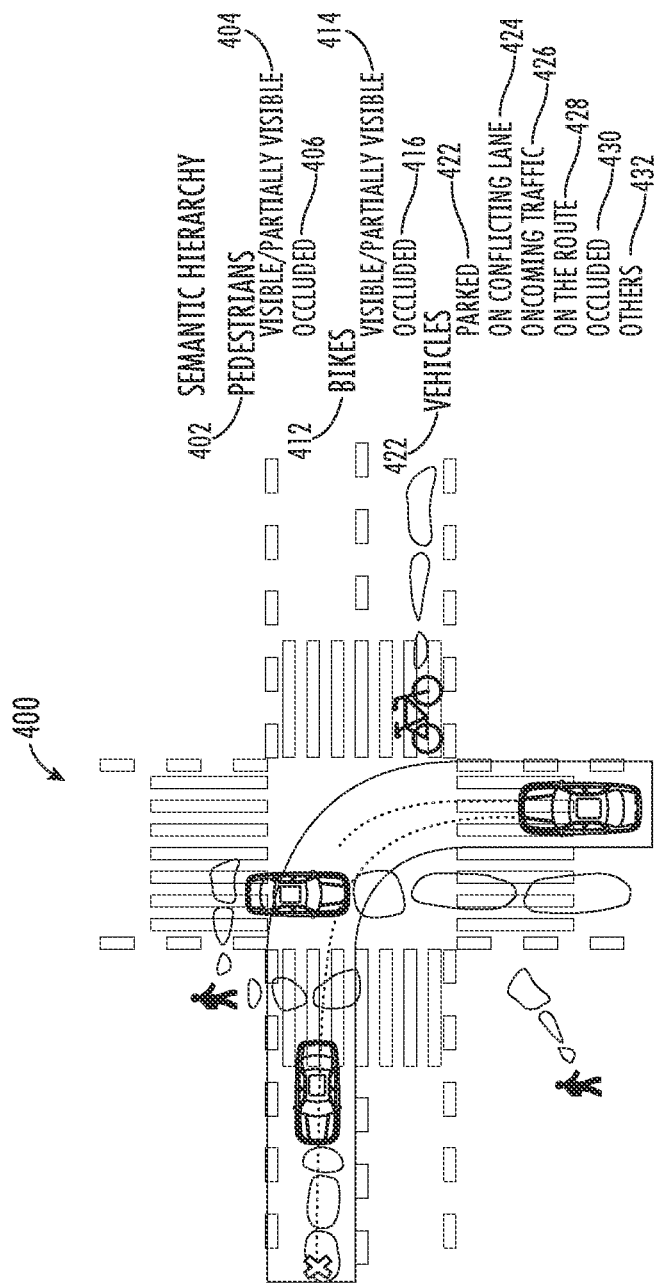
FIG. 4 depicts an example diagram of a semantic hierarchy map according to example embodiments of the present disclosure.

FIG. 4 depicts an example diagram 400 of a semantic hierarchy map according to example embodiments of the present disclosure. The depicted semantic hierarchy map is a combination of a plurality of semantic maps, each semantic map associated with a particular object type or subtype. Examples of semantic objects and object subtypes include pedestrians 402, both visible/partially visible pedestrians 404 and occluded pedestrians 406, bicycles 412 including both visible/partially visible bicycles 414 and occluded bicycles 416, and vehicles 420, including parked vehicles 422, on conflicting lane vehicles 424, oncoming traffic vehicles 426, on the route vehicles 428, occluded vehicles 430, and other vehicles 432.

In some examples, an occluded object can be predicted based on objects previously visible to the sensors but no longer visible due to other objects in the scene. This specific example diagram 400 shows data from a plurality of occupancy maps of a plurality of different semantic object types and for a plurality of different timesteps. Thus, the likely path of different objects is displayed.

Figure 5:
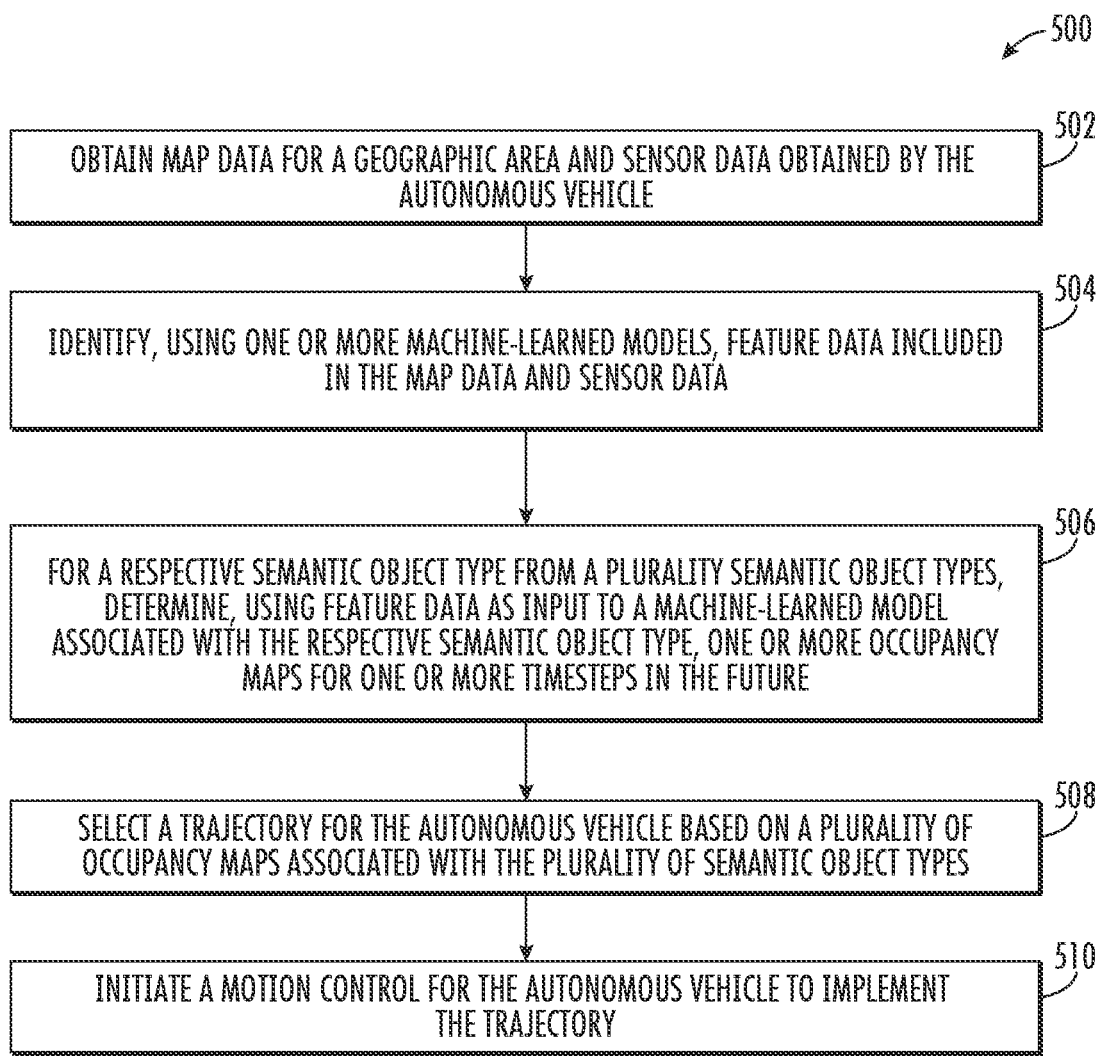
FIG. 5 depicts a flow chart diagram of an example method according to example embodiments of the present disclosure.

FIG. 5 depicts a flow chart diagram of an example method 500 for improving the detection and prediction processes of an autonomous vehicle (e.g., autonomous vehicle 105 in FIG. 1) according to example embodiments of the present disclosure. One or more portions of method can be implemented by one or more computing devices such as, for example, a computing device associated with the vehicle computing system (e.g., vehicle computing system 110 in FIG. 1). One or more portions of the method 500 described herein can be implemented as an algorithm on the hardware components of the devices described herein (e.g., as in FIGS. 1-3, 6, and 7) to, for example, provide improved motion planning by improving detection and prediction. Although FIG. 5 depicts steps performed in a particular order for purposes of illustration and discussion, method 500 of FIG. 5 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

An autonomous vehicle (e.g., autonomous vehicle 105 in FIG. 1) can include a vehicle computing system (e.g., vehicle computing system 110 in FIG. 1). A vehicle computing system (e.g., vehicle computing system 110 in FIG. 1) can obtain, at 502, map data for a geographic area and sensor data obtained by the autonomous vehicle (e.g., autonomous vehicle 105 in FIG. 1). In some examples, the sensor data can be generated by a LIDAR sensor and can include multiple LIDAR sweeps. Each sweep can represent a full rotation of the LIDAR sensor. In some examples, the map data can include data describing the position of lanes, boundaries, crossing areas, and traffic control mechanisms.

The vehicle computing system (e.g., vehicle computing system 110 in FIG. 1) can identify, at 504, feature data included in the map data and sensor data. Feature data can include representations of data included in the map data and the sensor data but may not be interpretable to humans. Thus, the machine-learned models can be trained to extract features but those features may not be useful to a human reviewing the feature data. Feature data can include low level image data describing edges, corners, blobs, and so on.

The vehicle computing system (e.g., vehicle computing system 110 in FIG. 1) can generate a fused representation of the feature data included in the map data and the sensor data. Thus, the fused representation can include feature data for a three-dimensional representation of a geographic space included in the map data and the sensor data. Each position in the three-dimensional data can include feature data extracted from both the map data and the sensor data. Further machine-learned models can be trained to use this feature data to generate occupancy maps.

The vehicle computing system (e.g., vehicle computing system 110 in FIG. 1) can, for a respective semantic object type from a plurality semantic object types, determine, at 506, using feature data as input to a respective machine-learned model from a plurality of machine-learned models, one or more occupancy maps for one or more timesteps in the future. The respective machine-learned model can be trained to determine occupancy for the respective semantic object type. Thus, the vehicle computing system (e.g., vehicle computing system 110 in FIG. 1) can include a machine-learned model trained specifically to determine occupancy for each specific semantic object type and subtype.

In some examples, each occupancy map includes a grid of points, each point representing a specific area of the environment around the autonomous vehicle (e.g., autonomous vehicle 105 in FIG. 1) at a particular time step. For example, the environment around the autonomous vehicle can be a three-dimensional space 50 meters long, 40 meters wide, and 5 meters high. This space can be subdivided into a plurality of voxels (e.g., three-dimensional boxes) that each represent a portion of the total space (e.g., a 40 cm square cube). Each point can be associated with one of the voxels and can represent whether that voxel is occupied. In some examples, each point in the grid of points includes occupancy data representing whether the represented area includes an object of the semantic object type associated with the occupancy map.

In addition, the same position may be marked as occupied on different semantic occupancy maps. This may be a result of two distinct objects being associated with the same area of space representing a particular point on the occupancy maps. For example, a passenger exiting a vehicle may result in the space associated with the exiting passenger being marked as occupied on both the vehicle occupancy map and on the pedestrian occupancy map. In other examples, a particular point may have a possibility of one of the multiple different semantic object types or subtypes. For example, a vehicle may have the possibility of turning into the planned route of the autonomous vehicle (e.g., autonomous vehicle 105 in FIG. 1). As such, one or more points associated with the vehicle may be marked as occupied on both a semantic occupancy map associated with oncoming vehicles and a semantic occupancy map associated with vehicles on the intended route. In some examples, each point in each semantic occupancy map can have an associated confidence value.

The confidence value can represent the degree to which the point will actually be occupied. In addition, the confidence values associated with each point on a particular semantic occupancy map can represent the degree to which the vehicle computing system (e.g., vehicle computing system 110 in FIG. 1) is unsure of a future state or position of the vehicle. For example, a vehicle that is slowing may result in occupancy being marked on both an occupancy map associated with stationary or parked vehicles in a future time step and an occupancy map associated with vehicles in an oncoming lane associated with a future time step. The confidence values associated with the points on each occupancy map can be associated with the likelihood of the vehicle parking or continuing after slowing down. Thus, the points associated with the vehicle in the occupancy map for parked vehicles can have a 75% confidence value and the points associated with a vehicle in an oncoming lane occupancy can have a 25% confidence value. This would represent that the vehicle computing system has established that the vehicle is more likely to park than to continue in the oncoming lane, without ignoring the second possibility entirely.

In some examples, the plurality of machine-learned models can be recurrent neural networks. In other examples, the plurality of machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks.

The vehicle computing system (e.g., vehicle computing system 110 in FIG. 1) can select, at 508, a trajectory for the autonomous vehicle (e.g., autonomous vehicle 105 in FIG. 1) based on a plurality of occupancy maps associated with the plurality of semantic object types. To do so, the vehicle computing system (e.g., vehicle computing system 110 in FIG. 1) can generate a plurality of candidate trajectories. The candidate trajectories can be based on a basis path, which represents a provisional path through an area, and include lateral variations from the basis path.

For a respective candidate trajectory in the plurality of candidate trajectories, the vehicle computing system (e.g., vehicle computing system 110 in FIG. 1) can determine a cost associated with the respective candidate trajectory. Costs can be calculated based on the avoidance of object collision, keeping the autonomous vehicle (e.g., autonomous vehicle 105 in FIG. 1) on the travel way/within lane boundaries, preferring gentle accelerations to harsh ones, vehicle dynamics parameters (e.g., to keep the ride smooth, acceleration, jerk, etc.), and/or map parameters (e.g., speed limits, stops, travel way boundaries, etc.). The costs can take into account at least one of the following object cost(s): collision costs (e.g., cost of avoiding/experience potential collision, minimization of speed, etc.); overtaking buffer (e.g., give 4 ft of space with overtaking a bicycle, etc.); headway (e.g., preserve stopping distance when applying adaptive cruise control motion a moving object, etc.); actor caution (e.g., preserve the ability to stop for unlikely events, etc.); behavioral blocking (e.g., avoid overtaking backed-up traffic in the vehicle's lane, etc.); or other parameters. In some implementations, the cost function(s) can account for fixed buffer and/or speed dependent buffers (e.g., requiring more space for actors when the vehicle is passing at higher speeds, etc.). In some implementations, the costs can account for map geometry features such as the distance from the initial basis path, the location of lane boundaries, and road boundaries.

In some examples, each cost can be associated with a particular sub-cost value, representing one aspect of the cost of a particular trajectory. Each sub-cost value can be assigned a weight based on one or more factors including the current situation of the autonomous vehicle (e.g., autonomous vehicle 105 in FIG. 1). The sub-cost values can then be combined to produce a total cost of a trajectory at least partially based on the weights assigned to each sub-cost value.

In some examples, the vehicle computing system (e.g., vehicle computing system 110 in FIG. 1) can select a trajectory from the plurality of trajectories based, at least in part, on the costs associated with the plurality of trajectories. For example, the vehicle computing system (e.g., vehicle computing system 110 in FIG. 1) can select the candidate trajectory with the lowest calculated cost value. In some examples, the costs associated with the respective candidate trajectory is based, at least in part, on the plurality of occupancy maps.

In some examples, the vehicle computing system (e.g., vehicle computing system 110 in FIG. 1) can generate vehicle control signals based on the selected candidate trajectory. The autonomous vehicle (e.g., autonomous vehicle 105 in FIG. 1) can then execute the control signals such that the autonomous vehicle (e.g., autonomous vehicle 105 in FIG. 1) can follow the selected trajectory. The vehicle computing system (e.g., vehicle computing system 110 in FIG. 1) can, at 510, initiate a motion control for the autonomous vehicle (e.g., autonomous vehicle 105 in FIG. 1) to implement the trajectory.

Figure 6:
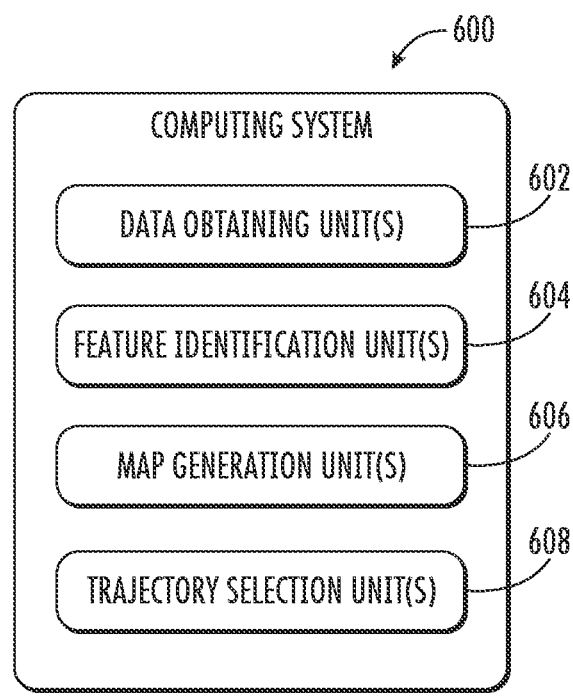
FIG. 6 depicts an example system with units for performing operations and functions according to example aspects of the present disclosure.

FIG. 6 depicts an example system 600 with units for performing operations and functions according to example aspects of the present disclosure. Various means can be configured to perform the methods and processes described herein. For example, a computing system can include data obtaining unit(s) 602, feature identification unit(s) 604, map generation unit(s) 606, trajectory selection unit(s) 608, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain map data for a geographic area and sensor data obtained by the autonomous vehicle (e.g., autonomous vehicle 105 in FIG. 1). For example, a vehicle computing system (e.g., vehicle computing system 110 in FIG. 1) can receive sensor data from one or more sensors and access map data from a database. A data obtaining unit 602 is one example of a means for obtaining map data for a geographic area and sensor data obtained by the autonomous vehicle (e.g., autonomous vehicle 105 in FIG. 1).

The means can be configured to determine, using one or more machine-learned models, feature data included in the map data and sensor data. For example, the vehicle computing system (e.g., vehicle computing system 110 in FIG. 1) can use a machine-learned model to identify one or more features. A feature identification unit 604 is one example of a means for determining, using one or more machine-learned models, feature data included in the map data and sensor data.

The means can be configured to determine for a respective semantic object type from a plurality semantic object types and using feature data as input to a machine-learned model associated with the respective semantic object type, one or more occupancy maps for one or more timesteps in the future. For example, the vehicle computing system (e.g., vehicle computing system 110 in FIG. 1) can generate a plurality of occupancy maps for each semantic object type and subtype and for a plurality of time steps. A map generation unit 606 is one example of a means for, determining, for a respective semantic object type from a plurality semantic object types and using feature data as input to a machine-learned model associated with the respective semantic object type, one or more occupancy maps for one or more timesteps in the future.

The means can be configured to select a trajectory for the autonomous vehicle (e.g., autonomous vehicle 105 in FIG. 1) based on a plurality of occupancy maps associated with the plurality of semantic object types. For example, the vehicle computing system (e.g., vehicle computing system 110 in FIG. 1) can select a trajectory from a plurality of candidate trajectories. A trajectory selection unit 608 is one example of a means for selecting a trajectory for the autonomous vehicle (e.g., autonomous vehicle 105 in FIG. 1) based on a plurality of occupancy maps associated with the plurality of semantic object types.

Figure 7:
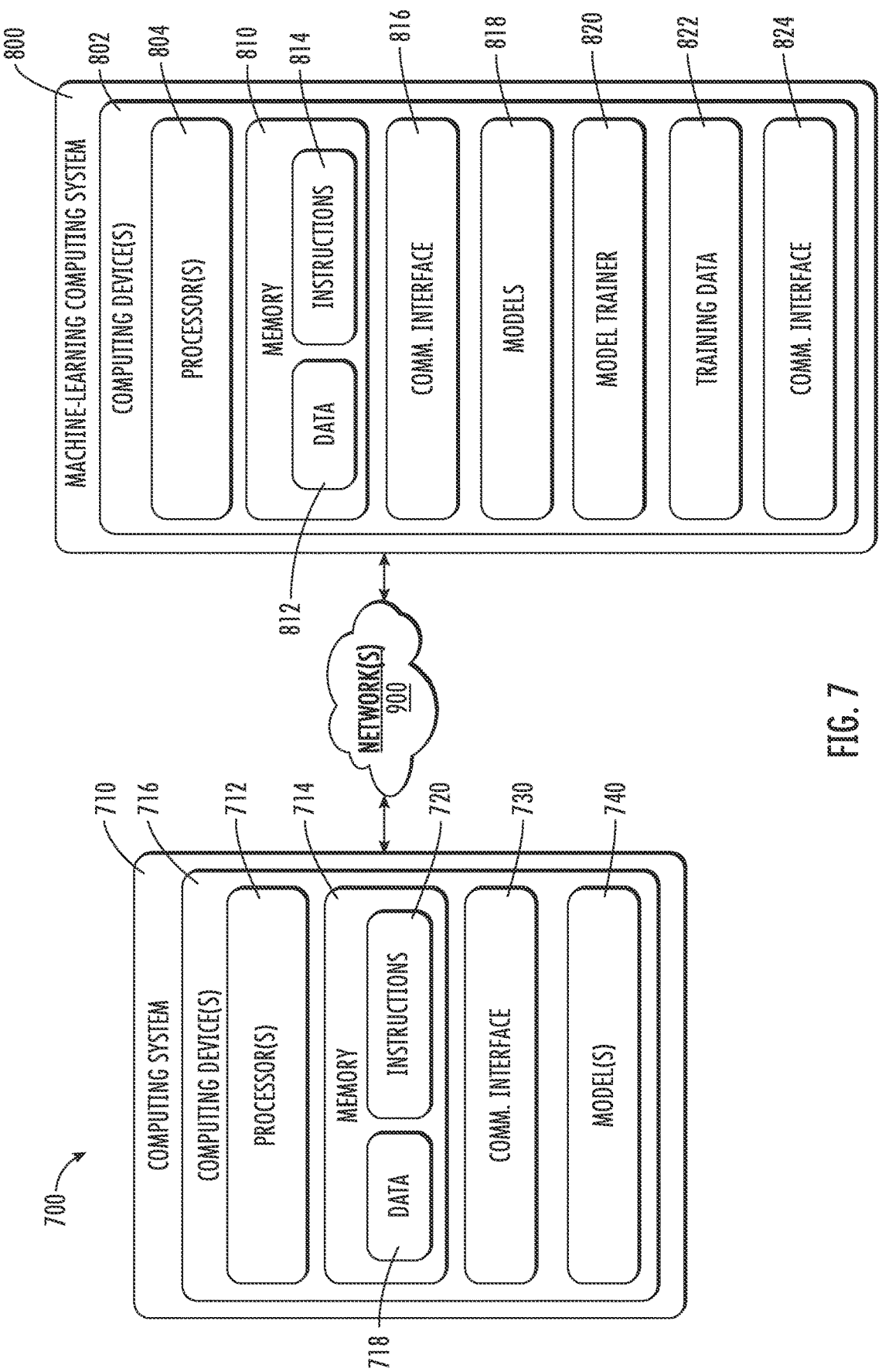
FIG. 7 depicts example system components according to example aspects of the present disclosure.

FIG. 7 depicts a block diagram of an example computing system 700 according to example embodiments of the present disclosure. The example system 700 includes a computing system 710 and a machine learning computing system 800 that are communicatively coupled over one or more networks 900.

In some implementations, the computing system 710 can operate to process data (e.g., sensor data, perception-prediction output data, etc.) using one or more vehicle system(s) (e.g., a motion planning system, a perception system, a prediction system, etc.). In some implementations, the computing system 710 can be included in an autonomous vehicle. For example, the computing system 710 can be on-board the autonomous vehicle. In other implementations, the computing system 710 is not located on-board the autonomous vehicle. For example, the computing system 710 can operate offline to perform training and/or utilization of a machine-learned semantic map generation model. The computing system 710 can include one or more distinct physical computing devices.

The computing system 710 can include a computing device 716. The computing device 716 can include one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage media, such as RAM, ROM, EEPROM, EPROM, one or more memory devices, flash memory devices, etc., and combinations thereof.

The memory 714 can store information that can be accessed by the one or more processors 712. For instance, the memory 714 (e.g., one or more non-transitory computer-readable storage mediums, memory devices) can store data 718 that can be obtained, received, accessed, written, manipulated, created, and/or stored. The data 718 can include, for instance, sensor data, map data, feature data, occupancy map data, motion control data, perception data, etc. as described herein. In some implementations, the computing system 710 can obtain data from one or more memory device(s) that are remote from the computing system 710.

The memory 714 can also store computer-readable instructions 720 that can be executed by the one or more processors 712. The instructions 720 can be software written in any suitable programming language or can be implemented in hardware. Additionally, or alternatively, the instructions 720 can be executed in logically and/or virtually separate threads on processor(s) 712.

For example, the memory 714 can store instructions 720 that when executed by the one or more processors 712 cause the one or more processors 712 (the computing system) to perform any of the operations and/or functions described herein, including, for example, processing data (e.g., sensor data, perception-prediction output data, etc.) using one or more autonomous vehicle system(s) (e.g., a motion planning system, a perception system, a prediction system, etc.), training and/or utilization of a machine-learned occupancy map generation model, testing of one or more system(s) of an autonomous vehicle (e.g., a motion planning system, etc.).

According to an aspect of the present disclosure, the computing system 710 can store or include one or more machine-learned models 730. As examples, the machine-learned models 740 can be or can otherwise include various machine-learned models such as, for example, neural networks (e.g., deep neural networks), support vector machines, convolutional neural networks (e.g., dual-head convolutional neural network(s), etc.), decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 710 can receive the one or more machine-learned models 740 from the machine learning computing system 800 over network(s) 900 and can store the one or more machine-learned models 740 in the memory 714. The computing system 710 can then use or otherwise implement the one or more machine-learned models 740 (e.g., by processor(s) 712). In particular, the computing system 710 can implement the machine learned model(s) 740 to generate a plurality of occupancy maps.

The machine learning computing system 800 can include one or more computing devices 802. The machine learning computing system 800 can include one or more processors 804 and a memory 814. The one or more processors 804 can be any suitable processing device (e.g., a processor core, a microprocessor, an ASIC, a FPGA, a controller, a microcontroller, etc.) and can be one processor or a plurality of processors that are operatively connected. The memory 810 can include one or more non-transitory computer-readable storage media, such as RAM, ROM, EEPROM, EPROM, one or more memory devices, flash memory devices, etc., and combinations thereof.

The memory 810 can store information that can be accessed by the one or more processors 804. For instance, the memory 810 (e.g., one or more non-transitory computer-readable storage mediums, memory devices) can store data 812 that can be obtained, received, accessed, written, manipulated, created, and/or stored. The data 812 can include, for instance, sensor data, map data, feature data, occupancy map data, motion control data, perception data, ground truth label(s), etc. as described herein. In some implementations, the machine learning computing system 800 can obtain data from one or more memory device(s) that are remote from the machine learning computing system 800.

The memory 810 can also store computer-readable instructions 814 that can be executed by the one or more processors 804. The instructions 814 can be software written in any suitable programming language or can be implemented in hardware. Additionally, or alternatively, the instructions 814 can be executed in logically and/or virtually separate threads on processor(s) 804.

For example, the memory 810 can store instructions 814 that when executed by the one or more processors 804 cause the one or more processors 804 (the computing system) to perform any of the operations and/or functions described herein, including, for example, training and/or utilization of a machine-learned semantic map generation model.

In some implementations, the machine learning computing system 800 includes one or more server computing devices. If the machine learning computing system 800 includes multiple server computing devices, such server computing devices can operate according to various computing architectures, including, for example, sequential computing architectures, parallel computing architectures, or some combination thereof.

In addition or alternatively to the model(s) 740 at the computing system 710, the machine learning computing system 800 can include one or more machine-learned models 818. As examples, the machine-learned models 818 can be or can otherwise include various machine-learned models such as, for example, neural networks (e.g., deep neural networks), convolutional neural network(s) (e.g., dual-head architecture network(s), etc.), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 800 can communicate with the computing system 710 according to a client-server relationship. For example, the machine learning computing system 800 can implement the machine-learned models 818 to provide a web service to the computing system 710. For example, the web service can provide training and/or utilization of a machine-learned semantic occupancy map generation model, and/or testing of various vehicle system(s) (e.g., motion planning system(s), etc.).

Thus, machine-learned models 740 can located and used at the computing system 710 and/or machine-learned models 818 can be located and used at the machine learning computing system 800.

In some implementations, the machine learning computing system 800 and/or the computing system 710 can train the machine-learned models 740 and/or 818 through use of a model trainer 820. The model trainer 820 can train the machine-learned models 740 and/or 818 using one or more training or learning algorithms. One example training technique is backwards propagation of errors. In some implementations, the model trainer 820 can perform supervised training techniques using a set of labeled training data. In other implementations, the model trainer 820 can perform unsupervised training techniques using a set of unlabeled training data. The model trainer 820 can perform a number of generalization techniques to improve the generalization capability of the models being trained. Generalization techniques include weight decays, dropouts, or other techniques.

In particular, the model trainer 820 can train a machine-learned model 740 and/or 818 based on a set of training data 822. The training data 822 can include, for example, ground truth perception label(s), ground truth prediction label(s), ground truth occupancy label(s), perception outputs, prediction outputs, occupancy map outputs, etc. The model trainer 820 can be implemented in hardware, firmware, and/or software controlling one or more processors.

The computing system 710 and the machine learning computing system 800 can each include a communication interface 730 and 824, respectively. The communication interfaces 730/824 can be used to communicate with one or more systems or devices, including systems or devices that are remotely located from the computing system 710 and the machine learning computing system 800. A communication interface 730/824 can include any circuits, components, software, etc. for communicating with one or more networks (e.g., 900). In some implementations, a communication interface 730/824 can include, for example, one or more of a communications controller, receiver, transceiver, transmitter, port, conductors, software and/or hardware for communicating data.

The network(s) 900 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 900 can be accomplished, for instance, via a network interface using any type of protocol, protection scheme, encoding, format, packaging, etc.

FIG. 7 illustrates one example computing system 700 that can be used to implement the present disclosure. Other computing systems can be used as well. For example, in some implementations, the computing system 710 can include the model trainer 820 and the training dataset 822. In such implementations, the machine-learned models 818 can be both trained and used locally at the computing system 710. As another example, in some implementations, the computing system 710 is not connected to other computing systems.

In addition, components illustrated and/or discussed as being included in one of the computing systems 710 or 800 can instead be included in another of the computing systems 710 or 800. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for autonomous vehicle motion control, the method comprising:
    obtaining, by a computing system including one or more processors, map data for a geographic area and sensor data obtained by the autonomous vehicle;
    identifying, by the computing system, feature data included in the map data and sensor data;
    determining, by the computing system and using feature data as input to a plurality of machine-learned models, a plurality of sets of occupancy maps, each set of occupancy maps corresponding to a unique semantic object type for one or more timesteps in the future, and wherein the respective machine-learned model is trained to determine occupancy for each of the plurality of semantic object types; and
    selecting, by the computing system, a trajectory for the autonomous vehicle based on a plurality of occupancy maps associated with the plurality of semantic object types.

2. The computer-implemented method of claim 1, wherein semantic object types are organized into a semantic hierarchy.

3. The computer-implemented method of claim 1, wherein the semantic object types can include pedestrians, bicycles, and vehicles.

4. The computer-implemented method of claim 3, wherein each semantic object type includes one or more subtypes.

5. The computer-implemented method of claim 4, wherein the one or more subtypes can include occluded object types.

6. The computer-implemented method of claim 1, further comprising:
    generating, by the computing system, a fused representation of the feature data included in the map data and the sensor data.

7. The computer-implemented method of claim 1, wherein a particular occupancy map includes a grid of points, each point representing a specific area of the environment around the autonomous vehicle at a particular time step.

8. The computer-implemented method of claim 7, wherein each point in the grid of points includes occupancy data representing whether the represented area includes an object of the semantic object type associated with the occupancy map.

9. The computer-implemented method of claim 7, wherein each point in the grid of points includes a confidence value.

10. The computer-implemented method of claim 1, wherein selecting, by the computing system, a trajectory for the autonomous vehicle based on a plurality of occupancy maps associated with the plurality of semantic object types further comprises:
    generating, by the computing system, a plurality of candidate trajectories.

11. The computer-implemented method of claim 10, wherein selecting, by the computing system, a trajectory for the autonomous vehicle based on a plurality of occupancy maps associated with the plurality of semantic object types further comprises:
    for a respective candidate trajectory in the plurality of candidate trajectories:
        determining, by the computing system, a cost associated with the respective candidate trajectory; and
        selecting, by the computing system, a trajectory from the plurality of trajectories based, at least in part, on the costs associated with the plurality of trajectories.

12. The computer-implemented method of claim 11, wherein the costs associated with the respective candidate trajectory is based, at least in part, on the plurality of occupancy maps.

13. The computer-implemented method of claim 1, wherein the map data includes data describing the position of lanes, boundaries, crossing areas, and traffic control mechanisms.

14. The computer-implemented method of claim 1, wherein the sensor data is generated by a LIDAR sensor and comprises multiple LIDAR sweeps.

15. The computer-implemented method of claim 1, wherein each machine-learned model in the plurality of machine-learned models is associated with a specific semantic object type.

16. The computer-implemented method of claim 1, wherein the plurality of machine-learned models are recurrent neural networks.

17. A computing system for an autonomous vehicle, the system comprising:
    one or more processors and one or more non-transitory computer-readable memories;
    wherein the one or more non-transitory computer-readable memories store instructions that, when executed by the processor, cause the computing system to perform operations, the operations comprising:
        obtaining map data for a geographic area and sensor data obtained by the autonomous vehicle;
        identifying, using one or more machine-learned models, feature data included in the map data and sensor data;
        determining, using feature data as input to a plurality of machine-learned models, a plurality of sets of occupancy maps, each set of occupancy maps corresponding to a unique semantic object type for one or more timesteps in the future; and
        selecting a trajectory for the autonomous vehicle based on a plurality of occupancy maps associated with the plurality of semantic object types.

18. The computing system of claim 17, wherein semantic object types are organized into a semantic hierarchy.

19. The computing system of claim 17, wherein the semantic object types can include pedestrians, bicycles, and vehicles.

20. An autonomous vehicle, comprising:
one or more processors; and
one or more non-transitory computer-readable media that collectively store instructions that, when executed by the one or more processors, cause the one or more processors to perform operations, the operations comprising:
obtaining map data for a geographic area and sensor data obtained by the autonomous vehicle;
identifying, using one or more machine-learned models, feature data included in the map data and sensor data;
determining using feature data as input to a plurality of machine-learned models, a plurality of sets of occupancy maps, each set of occupancy maps corresponding to a unique semantic object type for one or more timesteps in the future; and
selecting a trajectory for the autonomous vehicle based on a plurality of occupancy maps associated with the plurality of semantic object types.

* * * * *